United States Patent
Petersen et al.

(10) Patent No.: US 9,784,421 B1
(45) Date of Patent: Oct. 10, 2017

(54) LINEAR LIGHTING WITH DISTRIBUTED ONBOARD POWER CONVERSION

(71) Applicant: Elemental LED, Inc., Emeryville, CA (US)

(72) Inventors: Russell Petersen, Alameda, CA (US); James Stillman, Shenzhen (CN)

(73) Assignee: Elemental LED, Inc., Emeryville, CA (US)

( * ) Notice: Subject to any disclaimer, the term of this patent is extended or adjusted under 35 U.S.C. 154(b) by 0 days.

(21) Appl. No.: 15/409,101

(22) Filed: Jan. 18, 2017

Related U.S. Application Data (60) Provisional application No. 62/344,670, filed on Jun. 2, 2016.

(51) Int. Cl.
| | |
|---|---|
| *H05B 41/30* | (2006.01) |
| *F21S 4/22* | (2016.01) |
| *F21V 23/00* | (2015.01) |
| *H05B 33/08* | (2006.01) |
| *F21V 23/06* | (2006.01) |
| *F21Y 115/10* | (2016.01) |

(52) U.S. Cl.
CPC .............. *F21S 4/22* (2016.01); *F21V 23/005* (2013.01); *F21V 23/06* (2013.01); *H05B 33/0809* (2013.01); *H05B 33/0827* (2013.01); *F21Y 2115/10* (2016.08)

(58) Field of Classification Search
CPC .... H05B 41/34; H05B 33/0803; H05B 39/09; H05B 41/28; H05B 33/0809; H05B 33/0827; H05B 33/0821; F21Y 2101/02
USPC ..... 315/200 R, 209 R, 185 R, 191, 192, 246
See application file for complete search history.

(56) References Cited

U.S. PATENT DOCUMENTS

| | | | |
|---|---|---|---|
| 6,091,023 | A | 7/2000 | O'Donnell |
| 9,239,136 | B1 | 1/2016 | Petersen et al. |
| 9,341,359 | B1 | 5/2016 | Fernandez et al. |
| 9,491,821 | B2 | 11/2016 | Shackle |
| 9,509,110 | B1 | 11/2016 | Buck et al. |

(Continued)

FOREIGN PATENT DOCUMENTS

| | | |
|---|---|---|
| CN | 101135422 A | 3/2008 |
| CN | 203797441 U | 8/2014 |

(Continued)

OTHER PUBLICATIONS

Jesco Lighting Group, LLC, "INFINA." Internet. Available at http://www.jescolighting.com/documents/Catalogs/DL-AC-FLEX.pdf. Sep. 2014.

(Continued)

*Primary Examiner* — Minh D A
(74) *Attorney, Agent, or Firm* — Andrew McAleavey (57) ABSTRACT

A strip of linear lighting with distributed power conversion is disclosed. The linear lighting includes a flexible PCB. The flexible PCB is divided into repeating blocks, which are arranged electrically in parallel with one another between power and ground. Each repeating block includes power conversion and conditioning circuits. A plurality of LED light engines are connected to the outputs of the power conversion and conditioning circuits, electrically in series with one another. The power conversion and conditioning circuits typically include at least a full-bridge rectifier. A pair of conductors run the length of the PCB adjacent to it and are connected to each of the repeating blocks. A flexible, transparent covering surrounds the PCB and pair of conductors.

22 Claims, 4 Drawing Sheets

(56) References Cited

U.S. PATENT DOCUMENTS

| | | |
|---|---|---|
| 2003/0056964 A1 | 3/2003 | Lalancette et al. |
| 2003/0102143 A1 | 6/2003 | Sato et al. |
| 2007/0153508 A1 | 7/2007 | Nall et al. |
| 2009/0065247 A1 | 3/2009 | Shelton et al. |
| 2012/0242239 A1 | 9/2012 | Miskin et al. |

FOREIGN PATENT DOCUMENTS

| | | |
|---|---|---|
| CN | 204100003 U | 1/2015 |
| DE | 19501339 C1 | 8/1996 |
| WO | WO9823015 A1 | 5/1998 |

OTHER PUBLICATIONS

Titan Micro Electronics, "Single-Channel LED Constant Current Driver Chip TM1810, Version 1.4" Internet. Available at http://www.titanmec.com/index.php/en/product/download/id/229.html. Sep. 7, 2015.

Written Opinon of the International Searching Authority for PCT/US2017/022129, filed Mar. 13, 2017.

European Patent Office, Search Report and Written Opinion for PCT/2017/035196, dated Jul. 20, 2017.

LINEAR LIGHTING WITH DISTRIBUTED ONBOARD POWER CONVERSION

CROSS-REFERENCE TO RELATED APPLICATIONS

This application claims priority to U.S. Provisional Patent Application No. 62/344,670, filed Jun. 2, 2016. The contents of that application are incorporated by reference in their entirety.

BACKGROUND OF THE INVENTION

1. Field of the Invention

Generally speaking, the invention relates to light-emitting diode (LED)-based linear lighting, and more particularly, to linear lighting with distributed onboard power conversion.

2. Description of Related Art

Over the last decade, lighting based on light-emitting diodes (LEDs) has become dominant in the lighting industry, and is widely used in both residential and commercial installations. LED-based lighting has a number of advantages compared with legacy incandescent and fluorescent lighting, including high efficiency and low power draw, relatively low operating temperatures, and, with some models, selectable color and controllable color temperature.

For most commercial and residential applications, two major types of LED-based lighting are used: bulb-type lamps and linear lighting. Bulb-type lamps are intended as direct replacements for incandescent light bulbs, typically have a shape similar to the type of bulb they are intended to replace, and are usually constructed to produce roughly the same light output as the bulbs they are intended to replace. Linear lighting is somewhat different—it usually includes a number of LEDs arranged at a regular spacing or pitch along a printed circuit board (PCB). That PCB may be rigid, made, for example, of FR4 composite, or it may be flexible, made, for example, of Mylar. In either case, the PCB usually has the form of a thin strip, although other shapes and sizes are possible.

One of the major advantages of linear lighting is its versatility. Alone, it can serve as accent lighting or task lighting, often in locations where it would be difficult to install traditional lighting fixtures. Placed in an appropriate extrusion and covered with a diffuser, it can serve as primary room lighting, replacing legacy fluorescent fixtures in offices. Properly electrically insulated and encapsulated, it can be used even in outdoor and wet locations.

In linear lighting, the individual LEDs themselves are usually packaged along with color-modifying elements, such as phosphors, and the packages may also include lensing and light-diffusing elements. LEDs used in linear lighting typically accept direct current (DC) voltages, often at low voltage levels. While the definitions of "low voltage" and "high voltage" depend on the authority one consults, for purposes of this description, voltages over about 50V will be considered to be high voltage.

Many types of linear lighting operate using low voltage DC, for example, 12-24 VDC. For example, the linear lighting disclosed in U.S. Pat. No. 9,239,136, the contents of which are incorporated by reference in their entirety, is intended to operate with low voltage DC. However, the linear lighting has an inherent voltage drop per unit length, which means that the voltage drops progressively lower as one moves from the end of the PCB where power is connected toward the far end of the PCB. Ultimately, this limits the maximum possible length of low-voltage DC linear lighting, because as the PCB gets longer, the voltage at the far end ultimately drops to a level below that needed to activate (i.e., saturate) the LEDs.

One ready solution to the problem of voltage drop in linear lighting is to increase the operating voltage. Although high-voltage AC linear lighting allows for longer runs, it comes with its own challenges. Typically, the LEDs themselves run on low-voltage DC, which means that somewhere and somehow, power must be converted from high-voltage AC to low-voltage DC to power the LEDs. The usual solution is to provide an external driver that transforms and rectifies the voltage. Drivers are often large, and are one more thing that a contractor or electrician must find room for when installing the lighting. Sometimes, placing a driver requires making a large and inconvenient hole in a wall. Better apparatus and methods for providing power for linear lighting would be useful.

SUMMARY OF THE INVENTION

One aspect of the invention relates to a strip of linear lighting with distributed power conversion. The linear lighting includes a flexible PCB. The flexible PCB is divided into repeating blocks, which are arranged electrically in parallel with one another between power and ground. Each repeating block includes power conversion and conditioning circuits. A plurality of LED light engines are connected to the outputs of the power conversion and conditioning circuits, electrically in series with one another. The power conversion and conditioning circuits typically include at least a full-bridge rectifier. A pair of conductors run the length of the PCB adjacent to it and are connected to each of the repeating blocks. A flexible, transparent covering surrounds the PCB and pair of conductors. In some embodiments, the power conversion and conditioning circuits include at least a full-bridge rectifier, and may also include a capacitor or resistor-capacitor (RC) filter. Each repeating block may also include ballast resistors, current control circuits, and other elements.

Other aspects, features, and advantages of the invention will be set forth in the description that follows.

BRIEF DESCRIPTION OF THE DRAWING FIGURES

The invention will be described with respect to the following drawing figures, in which like numerals represent like features throughout the figures, and in which.

DETAILED DESCRIPTION

Figure 1:
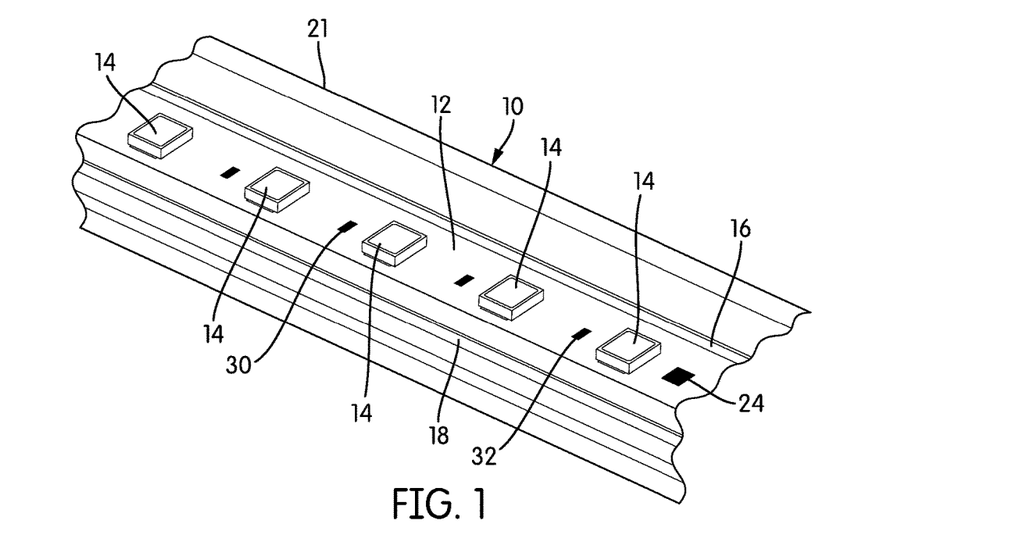
FIG. 1 is a perspective view of linear lighting according to one embodiment of the invention.

FIG. 1 is a perspective view of a strip of linear LED lighting, generally indicated at 10. The linear lighting 10 comprises a printed circuit board (PCB) 12 on which a number of LED light engines 14 are disposed, spaced at a regular pitch. The linear lighting 10 operates at high voltage. On the sides of the PCB 12, power and ground leads 16, 18 extend the full length of the linear lighting 10. The power and ground leads 16, 18 typically carry the voltage at which the linear lighting 10 is designed to operate, which may be, for example, 110-120V, 220-240V, or 277V of alternating current (AC). The entire assembly is enclosed within a flexible casing or covering 21, typically made of a clear plastic, such as polyvinyl chloride (PVC). The casing or covering 21 may include plasticizers and other conventional additives to modify its mechanical properties.

Typically, the PCB 12 would be flexible, made, for example, of a material such as Mylar. Of course, that is not the only material from which the PCB 12 may be made—in sufficiently thin section, many materials possess the kind of flexibility that is useful in the linear lighting 10, including thin sections of FR4 (i.e., glass fiber composite), aluminum, polyimide, silicon, gold, carbon nanotubes, and any number of plastics. In the linear lighting 10, the LED light engines 14 are mounted on a first layer, and there is at least one other layer that carries power and signals, although any number of layers may be included in the PCB 12, and those layers may be designed in any manner.

Depending on the application, the LED light engines 14 may be bare LEDs, but in most embodiments, each LED light engine 14 comprises one or more individual LEDs, packaged together with an element or elements that modify or diffuse the light produced by the LEDs. Most LED light engines 14 will include a phosphor to modify the color or color temperature of the light, and some may include diffusing or lensing elements as well. For purposes of this description, it will be assumed that the LED light engines 14 are configured to accept low voltage DC. The LED light engines 14 may be single color, red-green-blue (RGB) selectable color, or contain any other type of LEDs.

Figure 2:
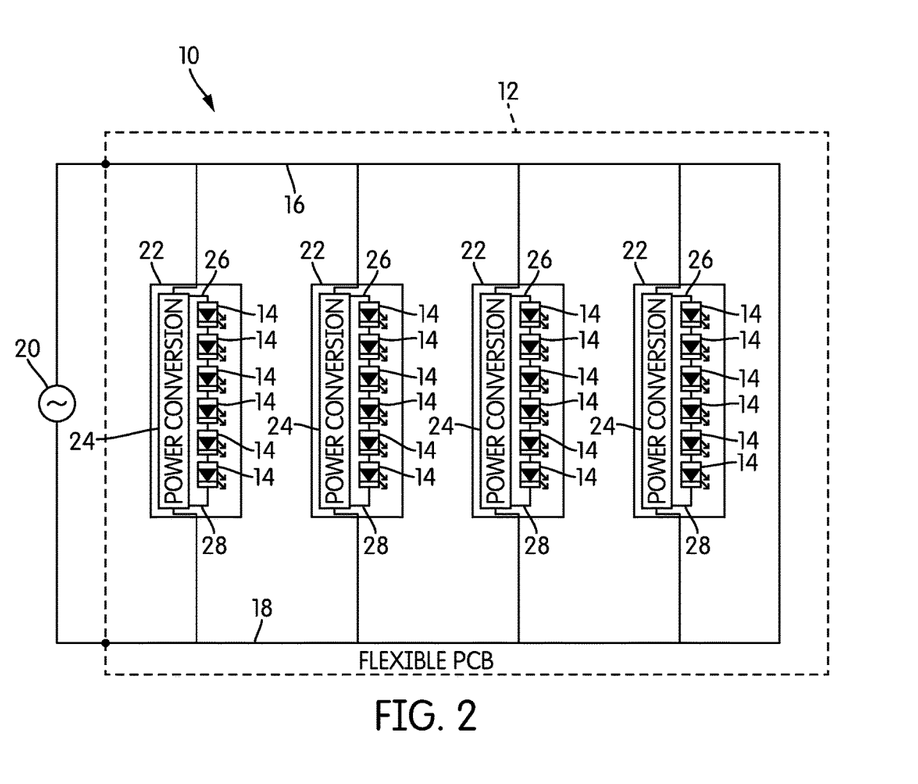
FIG. 2 is a schematic diagram of the linear lighting of FIG. 1.

FIG. 2 is a schematic diagram of the linear lighting 10 of FIG. 1, illustrating the manner in which the LED light engines 14 are connected to power. An AC power source 20 is indicated in FIG. 2. The AC power source 20 would typically be a household or commercial power source. In some embodiments, the power may be filtered to eliminate spikes, or delivered to the linear lighting 10 through a fuse or other components designed to mitigate the risk of electrical faults. However, as will be explained in greater detail below, the linear lighting 10 is designed to accept high voltage AC directly and convert it to DC as needed, with the power conversion function distributed across the entire active PCB 12. In many cases, this eliminates the need for a large, external driver.

While the linear lighting 10 is physically a continuous strip of LED light engines 14 arranged at a regular pitch on the PCB 12, electrically, the situation is somewhat more complex. The PCB 12 is divided into a number of repeating blocks 22. Each repeating block 22 has the same structure: a set of power conversion and conditioning circuits 24, to which a number of LED light engines 14 are connected. The power conversion and conditioning circuits 24 are electrically connected to the power and ground leads 16, 18 that traverse the length of the PCB 12; therefore, they draw high-voltage AC power from the AC power source 20 and convert that power from AC to DC. Connected to the outputs 26, 28 of the power conversion circuits 24 are a number of LED light engines 14.

As can be seen in FIG. 2, the repeating blocks 22 are electrically connected in parallel with respect to one another. The LED light engines 14 within each repeating block 22 (which draw low-voltage DC power from the power conversion circuits 24) are electrically connected in series with one another. This arrangement has several implications and advantages. For one, as was noted briefly above, the power conversion function is distributed over the entire PCB 12, with power conversion and conditioning circuits 24 in each repeating block 22. This means that the power conversion and conditioning circuits 24 can be designed to handle less power individually, as each of the power conversion circuits 24 need only convert and supply the amount of power needed for its repeating block 22, as opposed to converting and supplying all the power needed by the entire strip of linear lighting 12 at one point. The fact that the power conversion is distributed among the repeating blocks 22 also means that the power conversion and conditioning circuits 24 can be physically smaller, such that, in many cases, the power conversion circuits 24 can be on the PCB 12 without affecting the pitch or spacing of the LED light engines 14.

A second advantage lies in the arrangement of FIG. 2—an electrical fault, particularly within the connections between the LED light engines 14, is more likely to be isolated within a single repeating block 22. In other words, unless the main power and ground leads 16, 18 are broken or shorted, it is much less likely that a fault with a single LED light engine 14, or a connection between individual LED light engines 14, will cause the entire strip of linear lighting 10 to go dark. In this situation, it is more likely that only the LED light engines 14 within a single repeating block 22 will be affected.

The number of LED light engines 14 within each repeating block 22 may vary from embodiment to embodiment. The amount of power drawn by each LED light engine 14, the maximum power handling capabilities of the power conversion and conditioning circuits 24, and the maximum number of LED light engines 14 that are allowed to go dark in the case of a fault are all factors in the number of LED light engines 14 included in any repeating block 22. Typically, 6-8 LED light engines 14 would be included in any one repeating block 22, although, for example, up to 50 LED light engines 14 may be included in one repeating block 22 in some cases. Additionally, although it is advantageous if each repeating block 22 has the same number of LED light engines 14, in some cases, individual repeating blocks 22 may have different numbers of LED light engines 14. Variations on this are possible—for example, an A-type repeating block may have one number of LED light engines 14, while a B-type repeating block may have a second number of LED light engines 14, and those two blocks may be arranged in a regular pattern, such as A-B-A-B, along the length of the PCB 12. While it is also generally assumed for purposes of this description that the LED light engines 14 within each repeating block 22 will be identical, that need not be the case either—an A-type repeating block may have one type of LED light engines and a B-type repeating block may have another type of LED light engines.

The division of the linear lighting 10 into repeating blocks 22 has another practical advantage as well: the PCB 12 can be cut and terminated between repeating blocks 22, which means that the linear lighting 10 can be manufactured in long lengths and cut to shorter lengths. While regulatory requirements may control or influence by whom and under what circumstances the PCB 12 can be cut and terminated, such that the linear lighting 10 is not "field cuttable" in the usual sense (i.e., by an electrician or contractor at the time of installation), the manufacturer or an approved customizer can easily customize it for essentially any needed length by cutting between repeating blocks 22. The length of any one repeating unit may be, e.g., 10-12 cm with about a 1.5 cm pitch or spacing of the LED light engines 14, although the pitch and length of any particular repeating unit may be selected depending on the application and other factors. Jacketed in the casing or covering 21, the linear lighting 10 may have an overall width, for example, in the range of about 1.6 cm, with a covering 21 thickness in the range of about 2 mm. In a typical embodiment, a single length of the linear lighting may extend, e.g., about 50 m (about 150 feet) at 120V, or considerably longer if some diminishment in the light levels of the LED light engines 14 can be tolerated.

As those of skill in the art will realize, FIG. 2 focuses on power connections; the linear lighting 10 may also include data and control circuits and communication lines to control, for example, the color of the LED light engines 14, the light intensity of the LED light engines 14, and other such features. Each repeating block 22 may include such data and control circuits. For example 0-10V DC light intensity control may be implemented in the repeating blocks 22.

Figure 3:
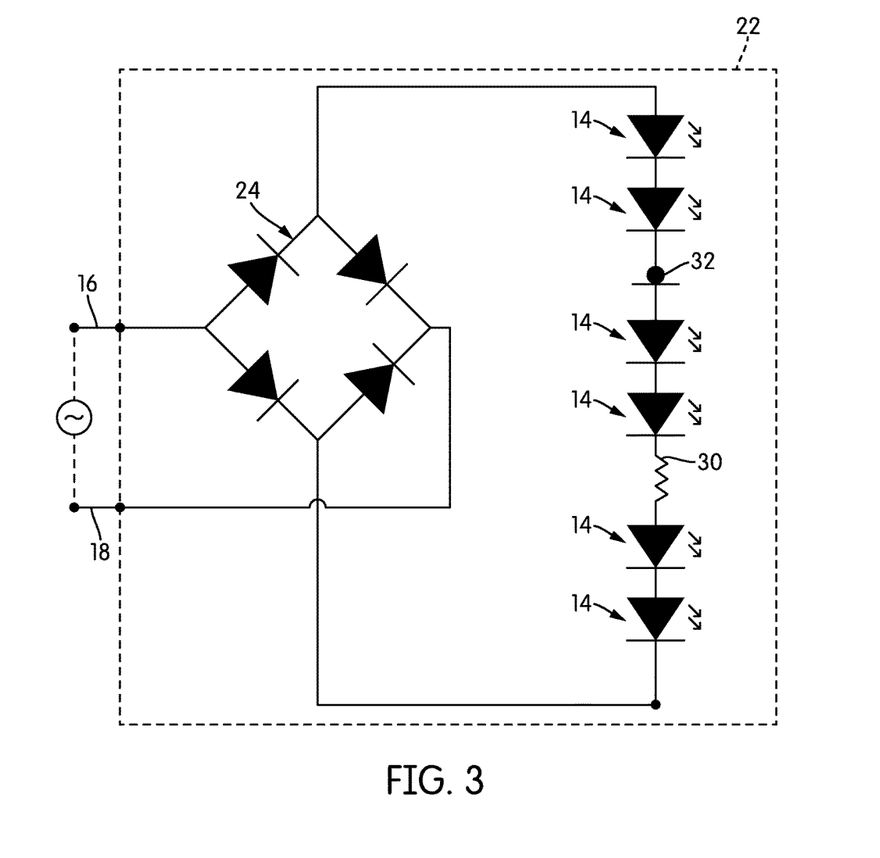
FIG. 3 is a circuit diagram of a repeating block according to one embodiment of the invention.

FIG. 3 is a circuit diagram of one embodiment of a repeating block 22. In this repeating block 22, the power conversion circuits 24 comprise a full-wave rectifier 24 (also called a "full-bridge" rectifier), which takes AC power from the power and ground leads 16, 18 that traverse the length of the PCB 12. The outputs of the full-wave rectifier 24 connect to a number of LED light engines 14, which are arranged in series with respect to one another. (In FIG. 3, the symbol for a single LED is used for clarity and simplicity, although it is understood that these LEDs would typically be in the form of packaged light engines 14, as described above.) A number of other components may also be included in the repeating block 22, typically in series or parallel with the LED light engines 14. For example, the repeating block 22 of FIG. 3 includes two components arranged in series with the LED light engines 14: a current control or ballast resistor 30, and a separate current controller 32, which is an integrated circuit that provides a constant output current. The resistor 30 and current controller 32 provide current at a constant level for the LEDs.

As those of skill in the art will appreciate, the repeating block 22 of FIG. 3 thus offers a relatively simple AC-to-DC power conversion, inverting the negative portion of the AC sinusoid and thus providing DC power at a frequency of twice that of the original AC power. The advantage of a relatively simple power conversion circuit in each repeating block 22 is that the components are generally small and robust, which means that they can be placed interstitially between the LED light engines 14 without changing or lengthening their pitch. This can be seen in the perspective view of FIG. 1, in which the rectifier 24 has the form of a small, packaged integrated circuit, and the other components, like the ballast resistor 30 and the current controller 32, are also placed interstitially between the LED light engines 14.

As those of skill in the art will also appreciate, LEDs typically operate best as constant current devices. The input voltage to any particular repeating block 22 will depend on its location along the PCB 12 relative to the power source and the voltage drop per unit length (or per repeating block 22) of the linear lighting 10. However, by use of resistors, current controllers, and other such elements, each repeating block 22 provides the LED light engines 14 with constant current.

Figure 4:
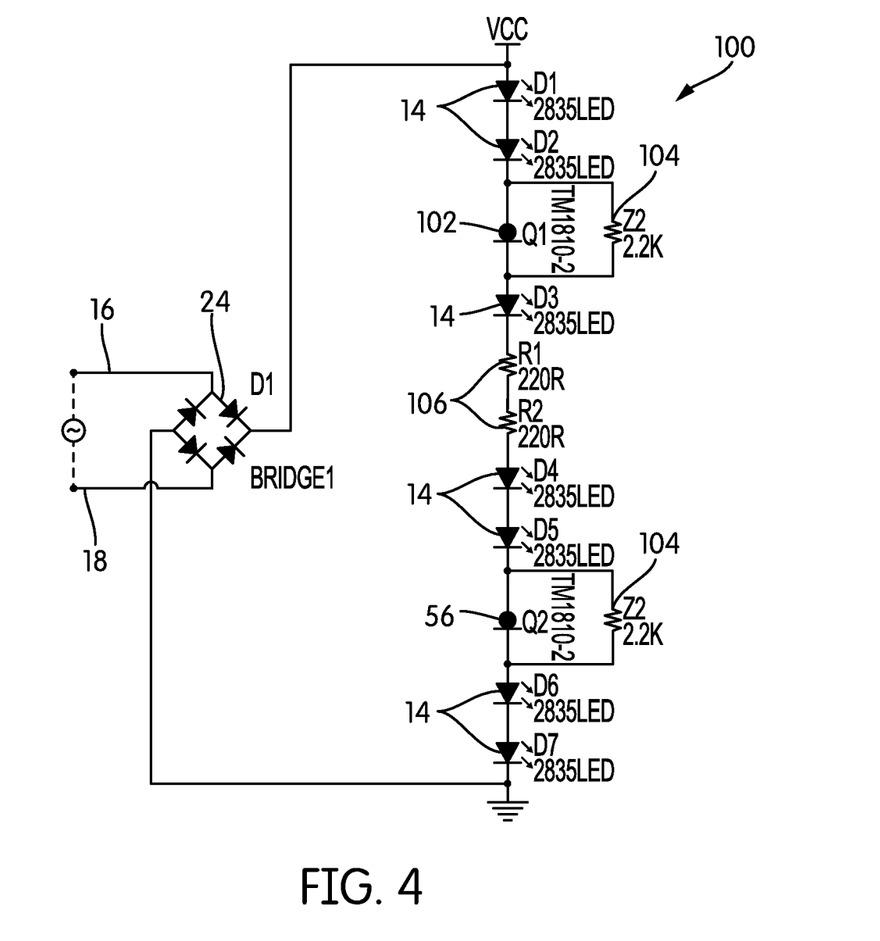
FIG. 4 is a circuit diagram of a repeating block according to another embodiment of the invention.

A somewhat more complex embodiment of a repeating block 100 is shown in FIG. 4. This repeating block 100 has the same full-bridge rectifier 24 as the previous embodiment. In the repeating block 100, there are seven LED light engines 14. A current controller 102 is positioned in series with the LED light engines 14. In this embodiment, the current controller 102 is a TM1810-2 single-channel LED constant current driver IC (Titan Micro Electronics, Shenzhen, China). Since each current controller 102 can handle at most about 24V input, a 2.2 kΩ resistor 104 is arranged in parallel with each current controller 102 to act as a voltage divider and reduce the input voltage to the current controller 102. There are also two general "ballast" resistors 106 arranged in series with the LED light engines 14, in this embodiment, each 220Ω. In essence, this embodiment of a repeating block 100 is adapted for the capabilities of the current controller 102.

The repeating blocks 22, 100 of FIGS. 3 and 4 use the output of the rectifier 24 as-is. That need not be the case in all embodiments. As was described briefly above, the output of a simple rectifier 24 is not a "smooth" waveform; rather, it ranges cyclically between 0V and a maximum that depends on the original AC voltage. This can create complications. When the voltage goes below a minimum saturation voltage needed to power the LED light engines 14—even briefly—the LED light engines 14 will switch off, as they respond very quickly to changes in voltage. If the frequency of the power signal is low enough, a flicker may be perceptible to the human eye. Flickering light is generally seen as undesirable, especially in applications where constant light output is expected or required. There are two potential solutions to this problem: offset the voltage of the power signal so that it never goes below the saturation voltage needed to power the LED light engines 14, or increase the frequency of the power signal beyond the human eye's ability to perceive any flicker, essentially allowing human persistence of vision to give the impression of constant light. Embodiments of the invention may use either approach or both approaches.

With respect to the frequency of the power signal, the full-wave rectifier 24 is, in essence a frequency doubler. As was noted briefly above, by inverting the negative portion of the AC sinusoid, it doubles the frequency. Thus, for example, a 60 Hz AC power signal becomes 120 Hz when rectified. This may be sufficient to eliminate visible flicker in at least some embodiments.

Figure 5:
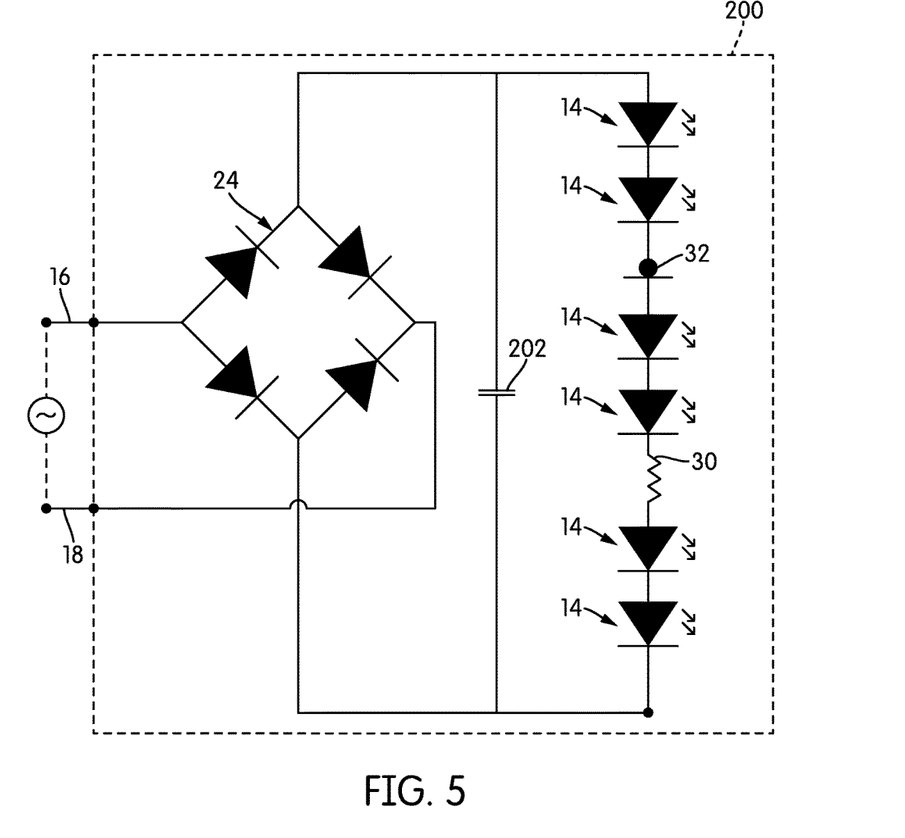
FIG. 5 is a circuit diagram of a repeating block implementing a power filter according to yet another embodiment of the invention.

As one example of how the power signal can also be modified to offset or increase the minimum voltage of the power signal, FIG. 5 illustrates a repeating block 200 according to yet another embodiment of the invention. In this embodiment, the components of the repeating block 200 are essentially the same as those in the repeating block 100 of FIG. 3. However, in addition to those components, the repeating block 200 includes a capacitor 202 in parallel to the LED light engines 14 and other components. When the rectifier 24 is delivering power, the capacitor 202 stores charge. When the voltage output of the rectifier 24 drops momentarily to zero as one cycle concludes and another begins, the capacitor 202 discharges, supplying a voltage to the circuit and keeping the total voltage seen by the LED light engines 14 above zero. With the repeating block 200, the power signal seen by the LED light engines 14 will have a sawtooth quality to it; in some cases, an additional resistor in series with the capacitor 202 can be used to control the rate at which the capacitor 202 discharges, and thus, smooth the power signal.

As those of skill in the art will appreciate, a capacitor that is large enough to handle high voltage may be physically rather large. If a single capacitor is too large to be placed in a repeating block 10, 100, 200, smaller capacitors or resistor-capacitor (RC) filters may be placed in parallel with each of the individual LED light engines 14.

Although the advantages of an onboard rectifier were described above with respect to a high-voltage strip light 10, these principles are equally applicable to a low-voltage strip light, e.g., operating at 12-24V. For example, outdoor landscape lighting sometimes operates at 12 VAC, and a strip light with an onboard rectifier and other power conditioning circuitry might be ideal in this application.

While the invention has been described with respect to certain embodiments, the embodiments are intended to be exemplary, rather than limiting. Modifications and changes may be made within the scope of the invention, which is defined by the appended claims.

What is claimed is:

1. A flexible strip of linear lighting, comprising:
    a narrow, elongate, flexible printed circuit board (PCB) physically and electrically arranged in a plurality of repeating blocks, each of the one or more repeating blocks being arranged electrically in parallel with one another between power and ground, and each of the plurality of repeating blocks including
        electrical connections to receive alternating current (AC) power,
        a power conversion and conditioning circuit mounted on the PCB and connected to the electrical connections that converts the AC power to direct current (DC) power, and
        a plurality of LED light engines electrically connected to the power conversion and conditioning circuit to receive the DC power; and
    a pair of conductors traversing the length of the flexible PCB to provide the power and the ground for each of the plurality of repeating blocks, the pair of conductors being connected to the AC electrical connections for each of the plurality of repeating blocks.

2. The strip of linear lighting of claim 1, wherein the printed circuit board comprises Mylar.

3. The strip of linear lighting of claim 1, further comprising a transparent, electrically insulative covering around the printed circuit board and the pair of conductors.

4. The strip of linear lighting of claim 3, wherein the covering is flexible.

5. The strip of linear lighting of claim 1, wherein the power conversion and conditioning circuit comprises a full-bridge rectifier.

6. The strip of linear lighting of claim 5, wherein the power conversion and conditioning circuit further comprises a filter that receives the output of the full-bridge rectifier.

7. The strip of linear lighting of claim 5, further comprising one or more current controllers in series with the plurality of LED light engines.

8. The strip of linear lighting of claim 1, wherein the AC power is high-voltage AC power.

9. The strip of linear lighting of claim 1, wherein the AC power is low-voltage AC power.

10. The strip of linear lighting of claim 1, wherein each of the plurality of repeating blocks is identical.

11. A flexible strip of linear lighting, comprising:
    a narrow, elongate, flexible printed circuit board (PCB) physically and electrically arranged in a plurality of repeating blocks, each of the plurality of repeating blocks being arranged electrically in parallel with one another between power and ground, and each of the plurality of repeating blocks including
        electrical connections to receive alternating current (AC) power,
        a power conversion and conditioning circuit mounted on the PCB and connected to the AC electrical connections that converts the AC power to direct current (DC) power, the power conversion and conditioning circuit including at least a full-bridge rectifier, and
        a plurality of LED light engines electrically connected to the power conversion and conditioning circuit to receive the DC power and arranged at a regular pitch along the flexible PCB;
    a pair of conductors traversing the length of the flexible PCB to provide the power and the ground for each of the plurality of repeating blocks, the pair of conductors being connected to the AC electrical connections for each of the plurality of repeating blocks; and
    a flexible, transparent covering or casing surrounding the flexible PCB.

12. The strip of linear lighting of claim 11, wherein each of the one or more repeating blocks further comprises one or more resistors.

13. The strip of linear lighting of claim 12, wherein each of the one or more repeating blocks further comprises a current controller.

14. The strip of linear lighting of claim 13, wherein the full-bridge rectifier, the one or more resistors, and the current controller are placed on the flexible PCB interstitially between adjacent ones of the LED light engines.

15. The strip of linear lighting of claim 11, wherein the flexible PCB comprises Mylar.

16. The strip of linear lighting of claim 11, wherein the AC power is high-voltage AC power.

17. The strip of linear lighting of claim 11, wherein the AC power is low-voltage AC power.

18. The strip of linear lighting of claim 11, wherein the power conversion and conditioning circuit further comprises a filter connected between the full-bridge rectifier and the LED light engines.

19. The strip of linear lighting of claim 11, wherein each of the plurality of repeating blocks is identical.

20. A flexible strip of linear lighting, comprising:
    a narrow, elongate, flexible printed circuit board (PCB) physically and electrically arranged in a plurality of repeating blocks, each of the plurality of repeating blocks being arranged electrically in parallel with one another between power and ground, and each of the plurality of repeating blocks including
        electrical connections to receive alternating current (AC) power,
        a power conversion and conditioning circuit mounted on the PCB and connected to the AC electrical connections that converts the AC power to direct current (DC) power, the power conversion and conditioning circuit including at least a full-bridge rectifier, and
        a plurality of LED light engines electrically connected to the power conversion and conditioning circuit to receive the DC power and arranged at a regular pitch along the flexible PCB;
    a flexible, transparent covering or casing surrounding the flexible PCB; and
    a pair of conductors traversing the length of the flexible PCB separate from and adjacent to the flexible PCB within the covering or casing to provide the power and the ground for each of the plurality of repeating blocks, the pair of conductors being connected to the AC electrical connections for each of the plurality of repeating blocks.

21. The strip of linear lighting of claim 20, wherein each of the plurality of repeating blocks is identical.

22. The strip of linear lighting of claim 20, wherein the AC power is high-voltage AC power and the DC power is low-voltage DC power.

\* \* \* \* \*